June 3, 1952  F. V. DONALD  2,598,768
DRIVE TRANSMISSION FOR GARDEN TYPE TRACTORS
Filed Jan. 5, 1949  3 Sheets-Sheet 1

Inventor
Forrest V. Donald

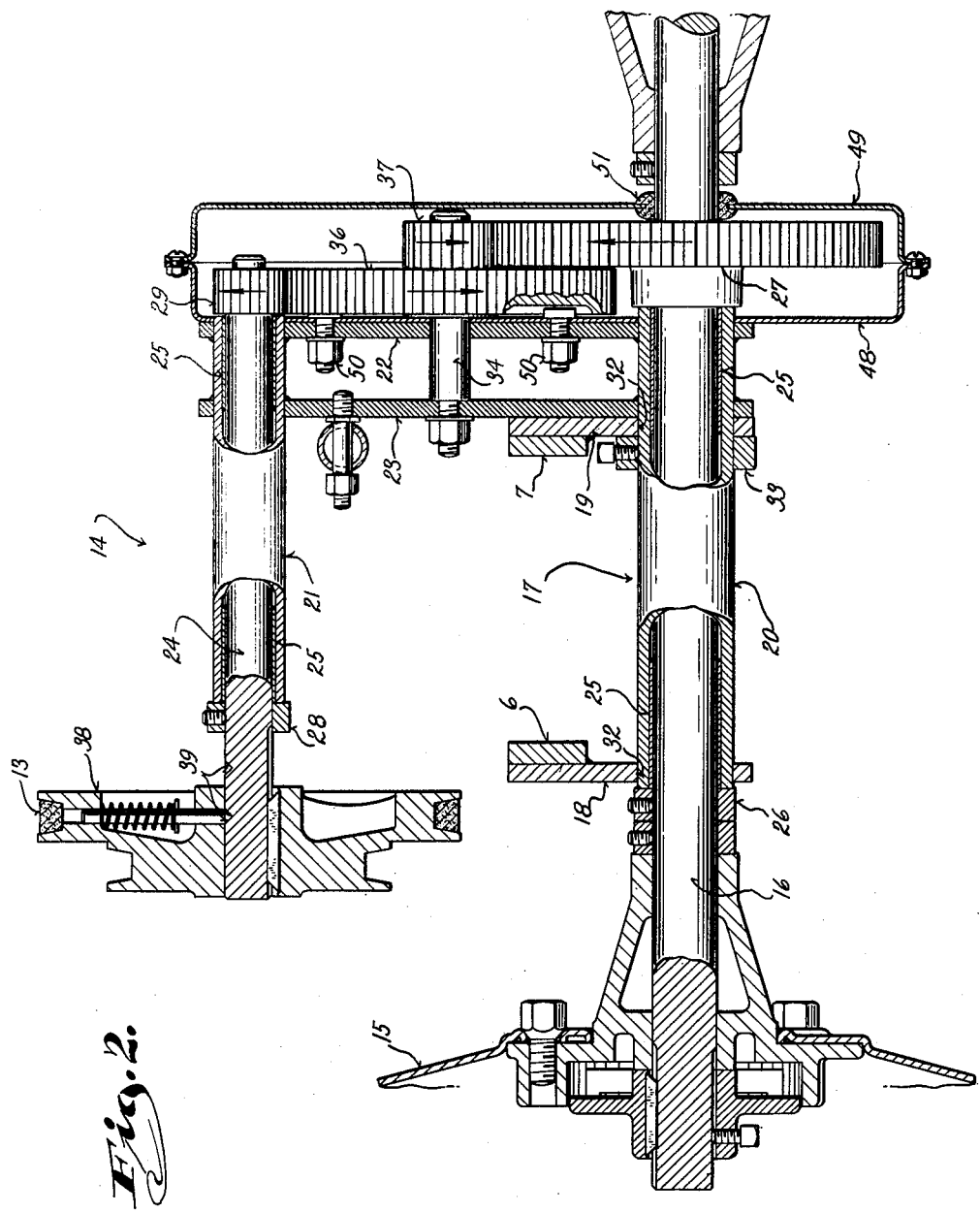

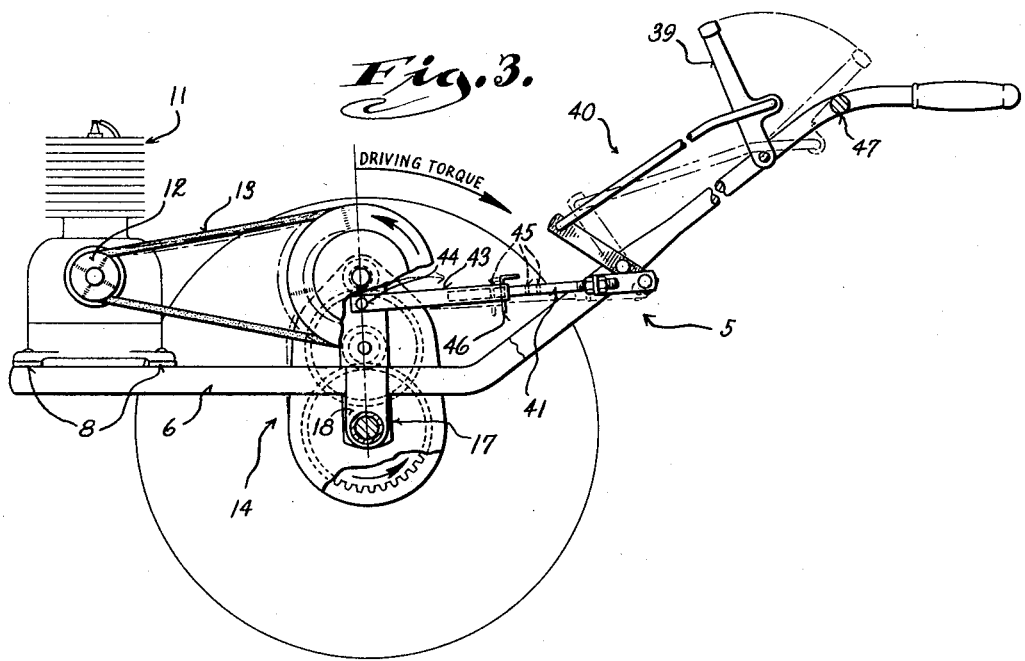
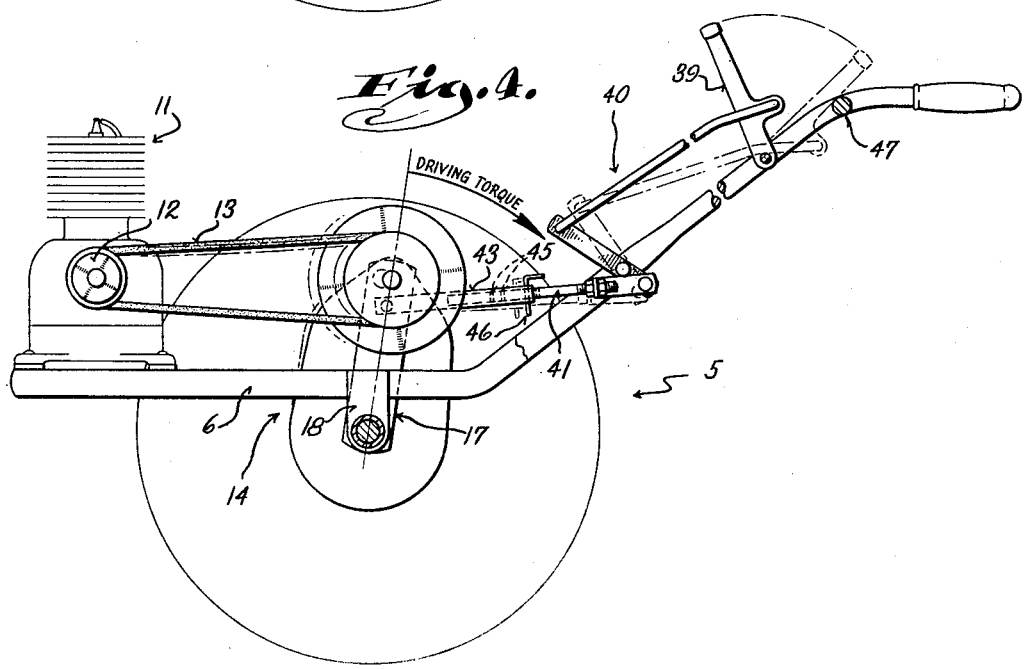

Patented June 3, 1952

2,598,768

UNITED STATES PATENT OFFICE 2,598,768

DRIVE TRANSMISSION FOR GARDEN TYPE TRACTORS

Forrest V. Donald, Milwaukee, Wis., assignor to Simplicity Manufacturing Company, Port Washington, Wis., a corporation of Wisconsin Application January 5, 1949, Serial No. 69,351

5 Claims. (Cl. 180—19)

1

This invention relates to tractors and refers more particularly to the smaller so-called garden type tractors.

As is well known to manufacturers and distributors of such tractors, price is one of the major factors governing design, but the attainment of low cost must not be at the expense of reliability and good performance. The manner in which power is transmitted from the engine of the tractor to the traction wheels is especially important in this respect for it is here where most tractors of the past failed to meet the test of practical simplicity.

In full recognition of the requirements of tractors of this type, the present invention has as its purpose to improve upon the tractors of the past, especially in the drive transmission thereof, to the end that the tractor of this invention possesses unprecedented simplicity, ruggedness and reliability, is easy to operate, and is fully capable of performing the work for which it is intended.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 2 is a transverse sectional view through the drive transmission, said view being taken on the plane of the line 2—2 in Figure 1;

Figure 3 is a longitudinal sectional view through the tractor illustrating the arrangement of the drive transmission for low speed operation, said view being more or less diagrammatic; and Figure 4 is a view similar to Figure 3 but showing the parts arranged for high speed operation.

Figure 1:
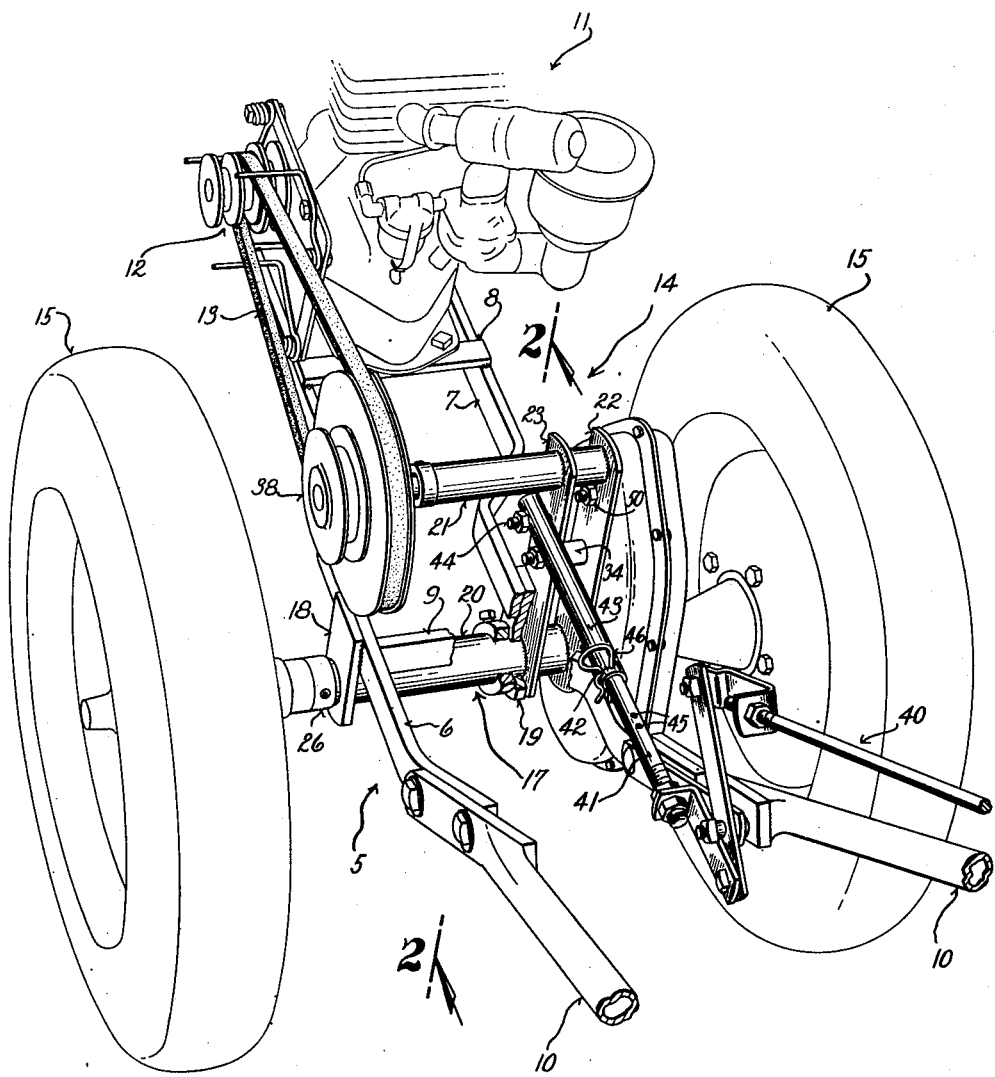
Figure 1 is a perspective view of a tractor embodying this invention, parts thereof being broken away and shown in section.

Referring now particularly to the accompanying drawings in which like numerals designate like parts throughout the several views, the numeral 5 designates generally the chassis of the tractor and which consists essentially of two side rails 6 and 7 rigidly connected by cross pieces 8 and 9. The entire chassis is preferably fabricated from steel cut and bent to shape with the various parts welded together.

2

The rear ends of the side rails are bent upwardly and have the handlebars 10 of the tractor bolted thereto. The engine or power plant 11 is mounted at the front of the chassis, where it is secured to the cross members 8. Its drive shaft is equipped with a multi-stepped V-belt pulley 12 to drive a V-belt 13 and thereby carry power into a drive transmission of novel construction designated generally by the numeral 14.

The tractor is of the two wheeled type, both of its wheels 15 being traction wheels mounted upon an axle shaft 16. The mounting of the wheels 15 on the ends of the axle shaft incorporates conventional ratchet type clutch mechanism which permits the differential action between the two wheels necessary to enable turning.

The chassis 5 is supported on the axle shaft 16 through the medium of a bearing housing unit indicated generally by the numeral 17, swingingly mounted between downwardly extending leg portions 18 and 19 welded to the side rails 6 and 7 respectively.

The bearing housing unit 17 is inexpensively constructed of two lengths of ordinary tubing 20 and 21 rigidly connected by two parallel spaced plate-like arms 22 and 23, both rigidly welded to each of the tubes near one end thereof. The tube 20 is of a size to receive the axle shaft 16, while the other tube 21 is somewhat shorter and smaller in diameter and has a countershaft 24 journaled therein. Bearings 25 in the ends of the tubes provide for free rotation of the shafts received therein.

The axle shaft 16 is held against endwise displacement with respect to the bearing housing unit by a collar 26 engaging one end of the tube 20 and the hub of a gear 27 keyed to the axle shaft and engaging the opposite end of the tube 20; and the countershaft 24 is held against endwise displacement by a collar 28 fixed thereto and bearing against one end of the tube 21 and a pinion 29 keyed to the opposite end of the countershaft and abutting the other end of the tube.

The ends of the tube 20 are rotatably received in holes 32 in the leg portions 18 and 19 so that the entire bearing housing unit may be swung about the axle. Transverse displacement of the bearing housing unit with respect to the chassis is precluded by virtue of the fact that the arm 23 abuts the outer face of the leg portion 19 and a collar 33 fixed to the tube 20 engages the inner face thereof.

A stub shaft 34 is fixed to the arms 22 and 23 in parallel relationship to the tubes 20 and 21 and substantially midway therebetween. Mounted on this stub shaft are two connected gears 36 and 37, the former meshing with the pinion 29 and the latter with the gear 27. The resulting gear train thus drivingly connects the countershaft 24 with the axle shaft 16.

The end of the countershaft opposite its pinion 29 has a multi-stepped V-belt pulley 38 slidably splined thereto, detents 39 being provided to hold the pulley in one or the other of its intended positions longitudinally of the shaft 24 and in line with the selected step of the pulley 12 so that the drive belt 13 tracks properly.

Obviously, through the selection of the step of the pulley 38 over which the belt 13 is trained it is possible to select the speed at which the tractor is driven, and since the drive transmission through the gear train is in nowise effected by swinging movement of the bearing housing unit about the axle shaft, starting and stopping of the tractor is easily and simply effected by effecting such movement to tighten and loosen the belt 13.

The desired swinging movement is imparted to the bearing housing unit by actuation of a manually operable lever 39 pivoted at the upper end of the handlebars, and connected with the bearing housing unit through linkage 40. The lever 39, as clearly shown in Figures 3 and 4, is arranged to swing through an arc having a fixed location. In its forward position, shown in full line in Figures 3 and 4, the driving connection is established while in its rearward position, illustrated in dotted lines in both of these views, the driving connection is disrupted.

Since the location of the arc through which the transmission gearing swings to tighten and loosen the belt varies with the selection of the groove or step of the pulley 38 over which the belt 13 is trained, and since the lever 39 swings through an arc of fixed location it is essential that means be provided for adjusting the length of the linkage 40.

For this purpose the linkage includes a rod 41 adjustably connected as at 42 to the adjacent portion of the linkage and telescopingly received within a tube 43 pivoted as at 44 to the arms 22 and 23. The rod 41 has a plurality of holes 45 through which a pin 46 received in complementary holes in the tube 43 may be inserted to connect the rod 41 to the tube 43 in any one of a number of positions. In one position the length of the linkage is correct for low speed operation (Figure 3) and in the other the length of the linkage is correct for high speed operation (Figure 4). In each instance the bearing housing unit and consequently the countershaft 24 is swung through the proper range of motion to tighten and loosen the belt as the lever 39 is actuated.

It is to be noted that as the lever 39 approaches its rearmost position (at which the belt is slack), shown in dotted lines in Figures 3 and 4, the connection between the lever and the linkage crosses dead center, and since the lever bears against a cross bar 47 in this position the parts are yieldingly maintained in this position. In the forward position of the lever (at which the belt is taut and the drive transmission operative) the normal driving torque holds the linkage in its set position since it tends to revolve the bearing housing unit around the axle shaft in a clockwise direction as viewed in Figures 2, 3 and 4. Moreover, by virtue of this arrangement the tension upon the belt increases as the load upon the tractor becomes heavier.

Attention is directed to the fact that by virtue of the novel construction of the bearing housing unit all of the shafts are rigidly held in proper alignment without necessitating costly machinery; since this simple inexpensive unit provides all the structural support required for the drive transmission, the housing or case for the transmission gearing may be a cheap stamping. The gear case thus consists of two complementary stampings 48 and 49 held together by bolts.

The section 48 fits flat against the arm 22 to which it is secured by bolts 50 and, of course, has holes through which the shafts protrude. The other section 49 has but a single hole through which the axle shaft 16 passes and this hole is provided with a suitable packing ring 51.

From the foregoing description taken in connection with the accompanying drawings it will be readily apparent to those skilled in the art that this this invention greatly simplifies the construction of garden tractors, and that the simplification effected thereby is achieved without sacrificing practical utility and ruggedness.

What I claim as my invention is:

1. In a garden type tractor: a chassis having transversely spaced portions provided with axially aligned holes; a bearing unit swingingly mounted between said spaced portions and comprising, two parallel spaced tubes, connected by a bridging arm fixed to both tubes, one of said tubes having its end portions rotatably received in said holes, an axle shaft freely rotatable within said tube and protruding beyond the ends thereof to mount the driving wheels of the tractor; a gear fixed to the axle shaft adjacent to one end of said tube; a countershaft journalled in the other tube; a pinion fixed to the end of the countershaft adjacent to said gear; a stub shaft mounted on the bridging arm between the two tubes; gears journalled on said stub shaft for drivingly connecting the pinion and gear whereby said shafts are drivingly connected in a manner permitting the countershaft to be swung in an arc around the axle shaft; means for drivingly connecting the countershaft with the power plant of the tractor, including a sheave fixed to the countershaft and a belt trained thereover, swinging movement of the bearing unit in one direction loosening the belt to effect disconnection of the drive, and in the opposite direction tightening the belt to establish the drive; and means for imparting such swinging movement to the bearing unit.

2. In a garden type tractor: a chassis having transversely spaced portions provided with axially aligned holes; a bearing housing unit comprising two parallel tubular members each having bearings therein and a rigid connection between said members by which they are held in parallel relationship, one of said members having its ends rotatably received in said axially aligned holes of the chassis so that the bearing housing unit may be swung in an arc about the axis of the holes; an axle shaft journalled in the bearings of said member with the ends of the shaft protruding from the member to mount the driving wheels of the tractor; a gear fixed to the axle shaft; a countershaft journalled in the bearings of the other tubular member; a pinion fixed to one end of the countershaft; a stub shaft carried by the connection between the members and parallel with said shafts; a connected gear and pinion journalled on the stub shaft and drivingly connecting the pinion with the gear on the axle shaft; means for drivingly connecting the countershaft with the engine of the tractor, including a sheave and a belt trained thereover so that swinging movement of the bearing housing unit in one direction loosens the belt to disable the driving connection while swinging movement in the opposite direction tightens the belt to render the driving connection operative; a pivoted hand lever; and linkage connecting the hand lever with the bearing housing unit whereby rocking of the lever imparts swinging movement to the bearing housing unit.

3. In a garden type tractor having a chassis, an engine and driving wheels; a drive transmission between the engine and driving wheels including: a bearing housing unit swingingly mounted upon the chassis and comprising two parallel tubes rigidly connected by an arm welded to the tubes, and bearings in the tubes; one of the tubes providing a journal by which the unit is swingingly mounted upon the chassis; an axle shaft journalled in the bearings of said tube and protruding beyond the ends of the tube to mount the driving wheels of the tractor; a countershaft journalled in the bearings in the other tube; a stub shaft anchored to the arm which connects the tubes, with its axis parallel to the axes of the countershaft and axle; a gear train for drivingly connecting the countershaft with the axle including a pinion fixed to the countershaft, gears rotatable on said stub shaft and a gear fixed to the axle shaft; a sheave keyed to the countershaft and about which an engine driven belt may be trained; a gear box enclosing the pinion and gears, said gear box being stamped from light guage metal and comprising two separably connected complementary sections; and means securing one of said sections to the arm with all of the shafts protruding into the gear box.

4. In a garden type tractor: a chassis provided with handle bars; an axle shaft; a bearing housing unit mounted on the chassis to swing about the axle shaft; driving wheels fixed to said axle shaft; a countershaft journalled in the bearing housing unit in spaced parallel relation with the axle shaft; a gear train drivingly connecting the countershaft with the axle shaft; means for driving the countershaft from the engine of the tractor, including a multistepped sheave splined to the countershaft, and an engine driven driving belt trained thereover; swinging movement of the bearing housing unit in one direction tightening the belt and in the other direction loosening the belt, the arc through which the unit swings to so establish and disrupt the driving connection being substantially the same regardless which of the sheave steps is in use but the location of said arc with respect to a fixed point on the chassis being different for each step of the sheave; a hand lever mounted on the handle bars and adapted to swing through an arc, the location of which is fixed; linkage connecting the lever with the bearing housing unit, said linkage being adjustable in length; and means for adjusting the length of said linkage to compensate for the changes in location of the arc through which the bearing housing unit swings as the different steps of the pulley are used.

5. In a mobile device having a chassis, an engine and a driving wheel; a drive transmission between the engine and driving wheel comprising: a bearing housing unit swingably mounted upon the chassis and comprising two parallel tubular members rigidly connected by an arm perpendicular to the axes of the tubular members, and bearings in the tubular members, one of the tubular members providing a journal by which the unit is swingably mounted upon the chassis; an axle shaft journalled in the bearings of said tubular member and protruding beyond an end of the tubular member to mount the driving wheel of the device; a countershaft journalled in the bearings in the other tubular member; a stub shaft anchored to the arm which connects the tubular members, with its axis parallel to the axes of the countershaft and axle; a gear train for drivingly connecting the countershaft with the axle including a pinion fixed to the countershaft, gears rotatable on said stub shaft and a gear fixed to the axle shaft; means for driving the countershaft from the engine of the device, including a multistepped sheave splined to the countershaft, and an engine driven driving belt trained thereover; swinging movement of the bearing housing unit in one direction tightening the belt and in the other direction loosening the belt, the arc through which the unit swings to so establish and disrupt the driving connection being substantially the same regardless which of the sheave steps is in use but the location of said arc with respect to a fixed point on the chassis being different for each step of the sheave; a handle for imparting such swinging movement to the bearing housing unit, said handle being movable through a fixed range; linkage connecting the handle with the bearing housing unit, said linkage being adjustable in length; and means for adjusting the length of said linkage to compensate for the changes in location of the arc through which the bearing housing unit swings as the different steps of the pulley are used.

FORREST V. DONALD.

REFERENCES CITED

The following references are of record in the file of this patent:

UNITED STATES PATENTS

| Number | Name | Date |
| --- | --- | --- |
| 2,069,245 | Haines | Feb. 2, 1937 |
| 2,070,288 | Mack | Feb. 9, 1937 |

FOREIGN PATENTS

| Number | Country | Date |
| --- | --- | --- |
| 450,038 | Great Britain | July 9, 1936 |